(12) United States Patent
Pani (10) Patent No.: US 9,985,794 B2
(45) Date of Patent: May 29, 2018

(54) TRACEROUTE IN A DENSE VXLAN NETWORK

(71) Applicant: Cisco Technology, Inc., San Jose, CA (US)

(72) Inventor: Ayaskant Pani, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days. days.

(21) Appl. No.: 14/449,033

(22) Filed: Jul. 31, 2014

(65) Prior Publication Data

US 2015/0124629 A1    May 7, 2015

Related U.S. Application Data

(60) Provisional application No. 61/900,359, filed on Nov. 5, 2013.

(51) Int. Cl.
*H04L 12/18* (2006.01)
*H04L 12/761* (2013.01)
(Continued)

(52) U.S. Cl.
CPC .......... *H04L 12/18* (2013.01); *H04L 12/4633* (2013.01); *H04L 41/082* (2013.01);
(Continued)

(58) Field of Classification Search
CPC ..... H04L 12/26; H04L 12/803; H04L 12/947; H04L 12/935; H04L 12/733; H04L 12/24; H04L 67/10; H04L 47/11; H04L 47/125; H04L 49/252; H04L 49/3009; H04L 45/22; H04L 45/50; H04L 45/28; H04L 43/0811; H04L 43/10; H04L 43/0852; H04L 43/04; H04L 41/0631; H04L 41/147
(Continued)

(56) References Cited

U.S. PATENT DOCUMENTS 6,456,624 B1    9/2002  Eccles et al.
7,152,117 B1   12/2006  Stapp et al.
(Continued)

FOREIGN PATENT DOCUMENTS

WO    WO 2014071996    5/2014

OTHER PUBLICATIONS

Whitaker, Andrew, et al., "Forwarding Without Loops in Icarus," IEEE OPENARCH 2002, pp. 63-75.

*Primary Examiner* — Andrew Chriss
*Assistant Examiner* — Rasha Fayed
(74) *Attorney, Agent, or Firm* — Polsinelli PC (57) ABSTRACT

Systems, methods and non-transitory computer-readable storage media for determining interconnectivity in dense networks. The method includes generating, at a first network device in a data network, a traceroute packet that includes source and destination address information. The packet is encapsulated in an outer packet, and the encapsulated packet is forwarded to a second network device and to one or more intermediate network devices in the data network. A response packet is received from the second network device and each of the intermediate network devices that received the traceroute packet. The first network device determines, based on the responsive packets, an end-to-end path taken by the traceroute packet through the data network.

14 Claims, 4 Drawing Sheets

(51) Int. Cl.

| | |
|---|---|
| *H04L 12/753* | (2013.01) |
| *H04L 12/721* | (2013.01) |
| *H04L 12/703* | (2013.01) |
| *H04L 12/705* | (2013.01) |
| *H04L 12/26* | (2006.01) |
| *H04L 12/733* | (2013.01) |
| *H04L 12/24* | (2006.01) |
| *H04L 12/751* | (2013.01) |
| *H04L 12/947* | (2013.01) |
| *H04L 12/931* | (2013.01) |
| *H04L 12/715* | (2013.01) |
| *H04L 29/12* | (2006.01) |
| *H04L 29/06* | (2006.01) |
| *H04L 12/46* | (2006.01) |

(52) U.S. Cl.
CPC .............. *H04L 41/12* (2013.01); *H04L 41/22* (2013.01); *H04L 43/0811* (2013.01); *H04L 43/50* (2013.01); *H04L 45/02* (2013.01); *H04L 45/12* (2013.01); *H04L 45/16* (2013.01); *H04L 45/18* (2013.01); *H04L 45/20* (2013.01); *H04L 45/28* (2013.01); *H04L 45/48* (2013.01); *H04L 45/64* (2013.01); *H04L 49/201* (2013.01); *H04L 49/25* (2013.01); *H04L 61/2007* (2013.01); *H04L 61/2061* (2013.01); *H04L 61/6004* (2013.01); *H04L 69/22* (2013.01); *H04L 61/103* (2013.01)

(58) Field of Classification Search
USPC ........................................ 370/248, 242, 237
See application file for complete search history.

(56) References Cited

U.S. PATENT DOCUMENTS

| | | | |
|---|---|---|---|
| 7,177,946 B1 | 2/2007 | Kaluve et al. | |
| 7,826,400 B2 | 11/2010 | Sakauchi | |
| 7,848,340 B2 | 12/2010 | Sakauchi et al. | |
| 8,339,973 B1* | 12/2012 | Pichumani | H04L 43/10 370/248 |
| 8,868,766 B1 | 10/2014 | Theimer et al. | |
| 9,258,195 B1 | 2/2016 | Pendleton et al. | |
| 9,374,294 B1 | 6/2016 | Pani | |
| 9,444,634 B2 | 9/2016 | Pani et al. | |
| 2003/0067912 A1 | 4/2003 | Mead et al. | |
| 2003/0115319 A1* | 6/2003 | Dawson | H04L 41/12 709/224 |
| 2004/0103310 A1 | 5/2004 | Sobel et al. | |
| 2004/0160956 A1 | 8/2004 | Hardy et al. | |
| 2004/0249960 A1 | 12/2004 | Hardy et al. | |
| 2005/0010685 A1 | 1/2005 | Ramnath et al. | |
| 2005/0013280 A1 | 1/2005 | Buddhikot et al. | |
| 2005/0083835 A1 | 4/2005 | Prairie et al. | |
| 2005/0117593 A1 | 6/2005 | Shand | |
| 2005/0175020 A1 | 8/2005 | Park et al. | |
| 2005/0207410 A1* | 9/2005 | Adhikari | H04L 12/4633 370/389 |
| 2006/0013143 A1 | 1/2006 | Yasuie et al. | |
| 2006/0028285 A1 | 2/2006 | Jang et al. | |
| 2006/0039364 A1 | 2/2006 | Wright | |
| 2006/0072461 A1 | 4/2006 | Luong et al. | |
| 2006/0193332 A1 | 8/2006 | Qian et al. | |
| 2006/0209688 A1 | 9/2006 | Tsuge et al. | |
| 2006/0221950 A1 | 10/2006 | Heer | |
| 2006/0227790 A1 | 10/2006 | Yeung et al. | |
| 2006/0250982 A1 | 11/2006 | Yuan et al. | |
| 2006/0268742 A1 | 11/2006 | Chu et al. | |
| 2006/0274647 A1 | 12/2006 | Wang et al. | |
| 2006/0280179 A1 | 12/2006 | Meier | |
| 2007/0025241 A1* | 2/2007 | Nadeau | H04L 12/4633 370/229 |
| 2007/0047463 A1 | 3/2007 | Jarvis et al. | |
| 2007/0165515 A1 | 7/2007 | Vasseur | |
| 2007/0171814 A1 | 7/2007 | Florit et al. | |
| 2007/0177525 A1 | 8/2007 | Wijnands et al. | |
| 2007/0183337 A1 | 8/2007 | Cashman et al. | |
| 2007/0217415 A1 | 9/2007 | Wijnands et al. | |
| 2007/0280264 A1 | 12/2007 | Milton et al. | |
| 2008/0031130 A1 | 2/2008 | Raj et al. | |
| 2008/0092213 A1 | 4/2008 | Wei et al. | |
| 2008/0147830 A1 | 6/2008 | Ridgill et al. | |
| 2008/0212496 A1 | 9/2008 | Zou | |
| 2009/0067322 A1 | 3/2009 | Shand et al. | |
| 2009/0094357 A1* | 4/2009 | Keohane | H04L 41/12 709/224 |
| 2009/0161567 A1 | 6/2009 | Jayawardena et al. | |
| 2009/0193103 A1 | 7/2009 | Small et al. | |
| 2009/0232011 A1* | 9/2009 | Li | H04L 43/50 370/248 |
| 2009/0238196 A1 | 9/2009 | Ukita et al. | |
| 2010/0020719 A1 | 1/2010 | Chu et al. | |
| 2010/0020726 A1 | 1/2010 | Chu et al. | |
| 2010/0191813 A1 | 7/2010 | Gandhewar et al. | |
| 2010/0191839 A1 | 7/2010 | Gandhewar et al. | |
| 2010/0223655 A1 | 9/2010 | Zheng | |
| 2010/0312875 A1 | 12/2010 | Wilerson et al. | |
| 2011/0022725 A1 | 1/2011 | Farkas | |
| 2011/0110241 A1 | 5/2011 | Atkinson et al. | |
| 2011/0138310 A1 | 6/2011 | Gomez et al. | |
| 2011/0170426 A1* | 7/2011 | Kompella | H04L 45/22 370/242 |
| 2011/0199891 A1 | 8/2011 | Chen | |
| 2011/0199941 A1 | 8/2011 | Ouellette et al. | |
| 2011/0243136 A1 | 10/2011 | Raman et al. | |
| 2011/0280572 A1 | 11/2011 | Vobbilisetty et al. | |
| 2011/0286447 A1* | 11/2011 | Liu | H04L 45/74 370/389 |
| 2011/0299406 A1* | 12/2011 | Vobbilisetty | H04L 43/0811 370/248 |
| 2011/0321031 A1 | 12/2011 | Dournov et al. | |
| 2012/0030150 A1 | 2/2012 | McAuley et al. | |
| 2012/0057505 A1 | 3/2012 | Xue | |
| 2012/0102114 A1 | 4/2012 | Dunn et al. | |
| 2012/0300669 A1 | 11/2012 | Zahavi | |
| 2013/0055155 A1 | 2/2013 | Wong et al. | |
| 2013/0097335 A1 | 4/2013 | Jiang et al. | |
| 2013/0182712 A1 | 7/2013 | Aguayo et al. | |
| 2013/0208624 A1 | 8/2013 | Ashwood-Smith | |
| 2013/0223276 A1 | 8/2013 | Padgett | |
| 2013/0227689 A1 | 8/2013 | Pietrowicz et al. | |
| 2013/0250779 A1 | 9/2013 | Meloche et al. | |
| 2013/0250951 A1 | 9/2013 | Koganti | |
| 2013/0276129 A1 | 10/2013 | Nelson et al. | |
| 2013/0311663 A1 | 11/2013 | Kamath et al. | |
| 2013/0311991 A1 | 11/2013 | Li et al. | |
| 2013/0322258 A1* | 12/2013 | Nedeltchev | H04L 43/04 370/241 |
| 2013/0322446 A1 | 12/2013 | Biswas et al. | |
| 2013/0322453 A1 | 12/2013 | Allan | |
| 2013/0329605 A1 | 12/2013 | Nakil et al. | |
| 2013/0332399 A1* | 12/2013 | Reddy | G06N 99/005 706/12 |
| 2013/0332577 A1 | 12/2013 | Nakil et al. | |
| 2013/0332602 A1* | 12/2013 | Nakil | G06N 99/005 709/224 |
| 2014/0016501 A1 | 1/2014 | Kamath et al. | |
| 2014/0068750 A1 | 3/2014 | Tjahjono et al. | |
| 2014/0086097 A1 | 3/2014 | Qu et al. | |
| 2014/0146817 A1 | 5/2014 | Zhang | |
| 2014/0149819 A1 | 5/2014 | Lu et al. | |
| 2014/0201375 A1 | 7/2014 | Beereddy et al. | |
| 2014/0219275 A1 | 8/2014 | Allan et al. | |
| 2014/0269712 A1 | 9/2014 | Kidambi | |
| 2014/0321277 A1 | 10/2014 | Lynn, Jr. et al. | |
| 2015/0016277 A1 | 1/2015 | Smith et al. | |
| 2015/0092593 A1 | 4/2015 | Kompella | |
| 2015/0113143 A1 | 4/2015 | Stuart et al. | |
| 2015/0124586 A1 | 5/2015 | Pani | |
| 2015/0124587 A1 | 5/2015 | Pani | |
| 2015/0124644 A1 | 5/2015 | Pani | |

(56) References Cited

U.S. PATENT DOCUMENTS

| | | |
|---|---|---|
| 2015/0124654 A1 | 5/2015 | Pani |
| 2015/0124823 A1 | 5/2015 | Pani et al. |
| 2015/0124842 A1 | 5/2015 | Pani |
| 2015/0127701 A1 | 5/2015 | Chu et al. |
| 2015/0188771 A1 | 7/2015 | Allan et al. |
| 2015/0378712 A1 | 12/2015 | Cameron et al. |
| 2015/0378969 A1 | 12/2015 | Powell et al. |
| 2016/0119204 A1 | 4/2016 | Murasato et al. |

* cited by examiner

TRACEROUTE IN A DENSE VXLAN NETWORK

CROSS-REFERENCES TO RELATED APPLICATIONS

This application claims priority to U.S. Provisional Patent Application No. 60/900,359, entitled "A Scalable Way to do Aging of a Very Large Number of Entities" filed on Nov. 5, 2013, which is hereby incorporated by reference herein in its entirety.

TECHNICAL FIELD

The present technology pertains to computer networks, and more specifically pertains to determining the inter-connectivity between various nodes in a dense data network.

BACKGROUND

Determining the interconnectivity between various nodes in a data network is an integral part in successfully troubleshooting and managing the traffic flow in the network. Attempts to accurately explore the detailed interconnectivity in dense CLOS or folded-CLOS topologies, have proven inadequate. Further, with a Virtual Extensible Local Area Network (VXLAN), the data traffic is embedded within the VXLAN encapsulation and thus traditional tools fail to explore the connection at the VXLAN infrastructure layer.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

The disclosed technology addresses the need in the art for determining the inter-connectivity relationship between various nodes in a data network having a dense topology.

Overview

In one aspect of the present disclosure, a method is provided that includes generating, at a first network device in a data network, a traceroute packet, where the traceroute packet includes source and destination address information. The traceroute packet is encapsulated in an outer packet, the outer packet including a destination address based on the destination address information of the inner traceroute packet. The encapsulated traceroute packet is forwarded to a second network device in the data network, where the second network device is identified based on the destination address of the outer packet. The second network device forwards the encapsulated traceroute packet to one or more intermediate network devices in the data network. The first network device receives response information from the second network device and each of the intermediate network devices, the response information identifying a path taken by the traceroute packet through the data network. The first network device determines an end-to-end path taken by the traceroute packet through the data network.

In another aspect of the present disclosure, a system is provided where the system includes a processor; and a computer-readable storage medium having stored therein instructions which, when executed by the processor, cause the processor to perform operations including generating, at a first network device in a data network, a traceroute packet, the traceroute packet including source and destination address information, encapsulating the traceroute packet in an outer packet, the outer packet including a destination address based on the destination address information of the inner traceroute packet, and forwarding the encapsulated traceroute packet to a second network device in the data network, the second network device identified based upon routing information, the destination address, and, in some cases, the destination port of the outer packet. The second network device forwards the encapsulated traceroute packet to one or more intermediate network devices in the data network. The first network device receives response information from the second network device and each of the intermediate network devices, the response information identifying a path taken by the traceroute packet through the data network, and determines an end-to-end path taken by the traceroute packet through the data network.

In yet another aspect of the present disclosure, there is provided a non-transitory computer-readable storage medium having stored therein instructions which, when executed by a processor, cause the processor to perform operations including generating, at a first network device in a data network, a traceroute packet, the traceroute packet including source and destination address information, encapsulating the traceroute packet in an outer packet, the outer packet including a destination address based on the destination address information of the traceroute packet, and forwarding the encapsulated traceroute packet to a second network device in the data network, the second network device identified based on routing information and the destination address of the outer packet. The second network device forwards the encapsulated traceroute packet to one or more intermediate network devices in the data network. The processor performs further operations including receiving response information from the second network device and each of the intermediate network devices, the response information identifying a path taken by the traceroute packet through the data network, and determining an one end-to-end path taken by the traceroute packet through the data network.

DETAILED DESCRIPTION

The present disclosure describes systems, methods, and non-transitory computer-readable storage media for determining the path between two nodes in a network. A traceroute packet is formed and injected into an ingress node's forwarding plane. The traceroute packet is a User Datagram Protocol ("UDP") packet with source and destination addresses set to the tenant source and host destination source addresses. The UDP header of the traceroute packet also includes source and destination port information. The ingress node encapsulates the packet within an outer packet header, and forwards the encapsulated packet to a switch, which then forwards the packet to other switches within the network. The destination address of the outer packet is set to the VXLAN tunnel-end-point ("TEP") switch to which the destination host of the traceroute packet is attached. The outer packet is forwarded based on the routing information in the VXLAN infra network. In case of multiple alternate paths between the originating switch and the destination TEP switch, the identity of the path taken by the encapsulated packet is determined by a hash computed from the packet's parameters, which includes the UDP source and destination ports. The intermediate switches receiving the packet send a copy of the packet to its own CPU while also forwarding the packet towards its original destination. This is typically done using a mechanism known as CPU logging.

Based on the copy of the packet at the intermediate switch CPU, various kinds of information can be derived. This information can include, for example, the identity of the ingress node, the switch port on which the packet was received, packet identification information (including the inner packet and the outer packet source destination address and IPv4 header's identifier), the time-to-live (TTL) for the packet, and time stamp information. Each node receiving the packet copies this information to its CPU and sends a response packet back to the originating node. The originating node collects this information and is able to determine the end-to-end path within the network taken by the traceroute packet. This is done for a given packet identifier by forming the end-to-end path based on the responding switch's identification sorted by the TTL value reported.

As discussed above, the infra network packet path is based on the hash computation based on the packet's header information including the UDP source and destination addresses. Therefore, by varying the source and destination port information of the inner packet, which in turn influences the outer VXLAN UDP port information, other end-to-end paths taken by the packet within the network can be determined.

Figure 1:
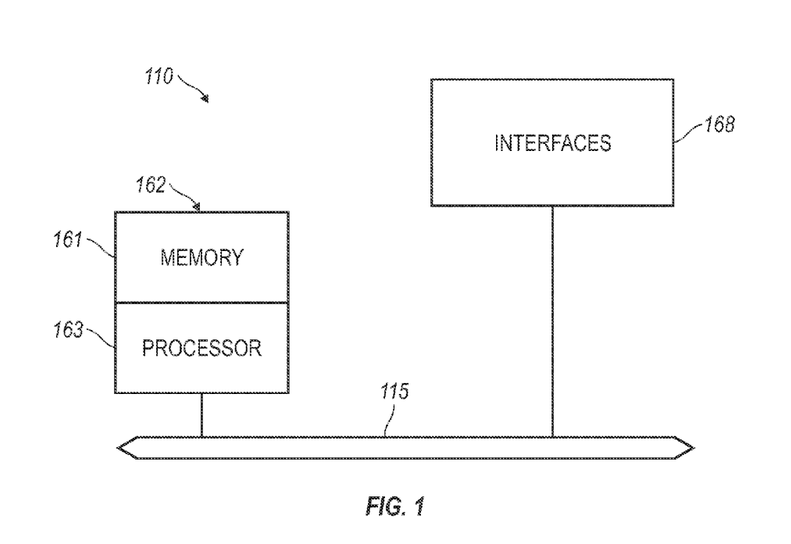
FIG. 1 illustrates an example network device in which embodiments of the present disclosure may be implemented.

FIG. 1 illustrates an example network device 110 suitable for implementing the present invention. Network device 110 includes a master central processing unit (CPU) 162, interfaces 168, and a bus 115 (e.g., a Peripheral Component Interconnect ("PCI") bus. When acting under the control of appropriate software or firmware, the CPU 162 is responsible for executing packet management, error detection, and/or routing functions, such as miscabling detection functions, for example. CPU 162 preferably accomplishes all these functions under the control of software including an operating system and any appropriate applications software. CPU 162 may include one or more processors 163 such as a processor from the Motorola family of microprocessors or the MIPS family of microprocessors. In an alternative embodiment, processor 163 is specially designed hardware for controlling the operations of router 110. In a specific embodiment, a memory 161 (such as non-volatile RAM and/or ROM) also forms part of CPU 162. However, there are many different ways in which memory could be coupled to the system.

The interfaces 168 are typically provided as interface cards (sometimes referred to as "line cards"). Generally, they control the sending and receiving of data packets over the network and sometimes support other peripherals used with the router 110. Among the interfaces that may be provided are Ethernet interfaces, frame relay interfaces, cable interfaces, Digital Subscriber Line ("DSL") interfaces, token ring interfaces, and the like. In addition, various very high-speed interfaces may be provided such as fast token ring interfaces, wireless interfaces, Ethernet interfaces, Gigabit Ethernet interfaces, Asynchronous Transfer Mode (ATM" interfaces, High Speed Serial Interfaces (HSSI), Packet-Over-SONET (POS) interfaces, Fiber Distributed Data Interfaces (FDDI) and the like. Generally, these interfaces may include ports appropriate for communication with the appropriate media. In some cases, they may also include an independent processor and, in some instances, volatile random access memory (RAM). The independent processors may control such communications intensive tasks as packet switching, media control and management. By providing separate processors for the communications intensive tasks, these interfaces allow the master microprocessor 162 to efficiently perform routing computations, network diagnostics, security functions, etc.

Although the system shown in FIG. 1 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 161) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 2:
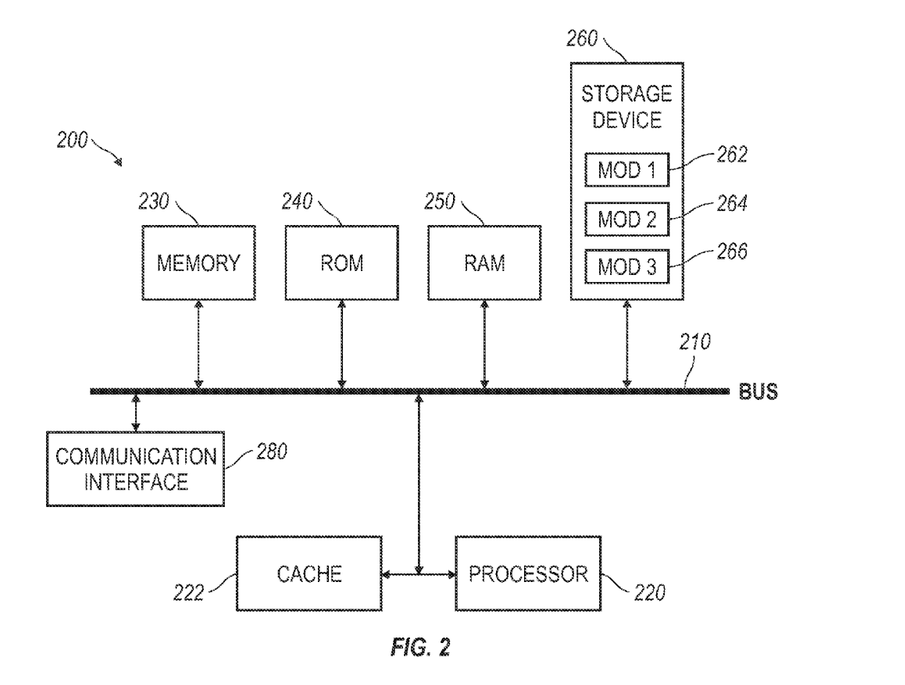
FIG. 2 illustrates an example system embodiment.

FIG. 2 illustrates an example computing system architecture 200 wherein the components of the system are in electrical communication with each other using a bus 205. Exemplary system 200 includes a processing unit (CPU or processor) 210 and a system bus 205 that couples various system components including the system memory 215, such as read only memory (ROM) 220 and (RAM) 225, to the processor 210. The system 200 can include a cache of high-speed memory connected directly with, in close proximity to, or integrated as part of the processor 210. The system 200 can copy data from the memory 215 and/or the storage device 230 to the cache 212 for quick access by the processor 210. In this way, the cache can provide a performance boost that avoids processor 210 delays while waiting for data. These and other modules can control or be configured to control the processor 210 to perform various actions. Other system memory 215 may be available for use as well. The memory 215 can include multiple different types of memory with different performance characteristics. The processor 210 can include any general purpose processor and a hardware module or software module, such as module 1 232, module 2 234, and module 3 236 stored in storage device 230, configured to control the processor 210 as well as a special-purpose processor where software instructions are incorporated into the actual processor design. The processor 210 may essentially be a completely self-contained computing system, containing multiple cores or processors, a bus, memory controller, cache, etc. A multi-core processor may be symmetric or asymmetric.

The communications interface 240 can generally govern and manage the user input and system output. There is no restriction on operating on any particular hardware arrangement and therefore the basic features here may easily be substituted for improved hardware or firmware arrangements as they are developed.

Storage device 230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 225, read only memory (ROM) 220, and hybrids thereof.

The storage device 230 can include software modules 232, 234, 236 for controlling the processor 210. Other hardware or software modules are contemplated. The storage device 230 can be connected to the system bus 205. In one aspect, a hardware module that performs a particular function can include the software component stored in a computer-readable medium in connection with the necessary hardware components, such as the processor 210, bus 205, display 235, and so forth, to carry out the function.

In one example of the methodology described herein, virtual extensible local area network ("VXLAN") is utilized as the infrastructure layer's encapsulation protocol. However, the use of VXLAN is exemplary only, and the methodology can be implemented using any encapsulation technology such as, for example, Transparent Interconnection of Lots of Links (TRILL). In VXLAN, the user's data traffic is injected into the VXLAN network from an ingress switch which encapsulates the user's data traffic within a VXLAN packet with the UDP source port set to a value based on the inner packet's header information. This dynamic setting of the UDP source port in a VXLAN header allows the packet to follow alternate Equal Cost Multi-Paths (ECMPs) within the VXLAN infra-network. At the egress switch (the boundary of the VXLAN network), the packet is de-capsulated and the inner packet (the user data packet) is forwarded out.

Figure 3:
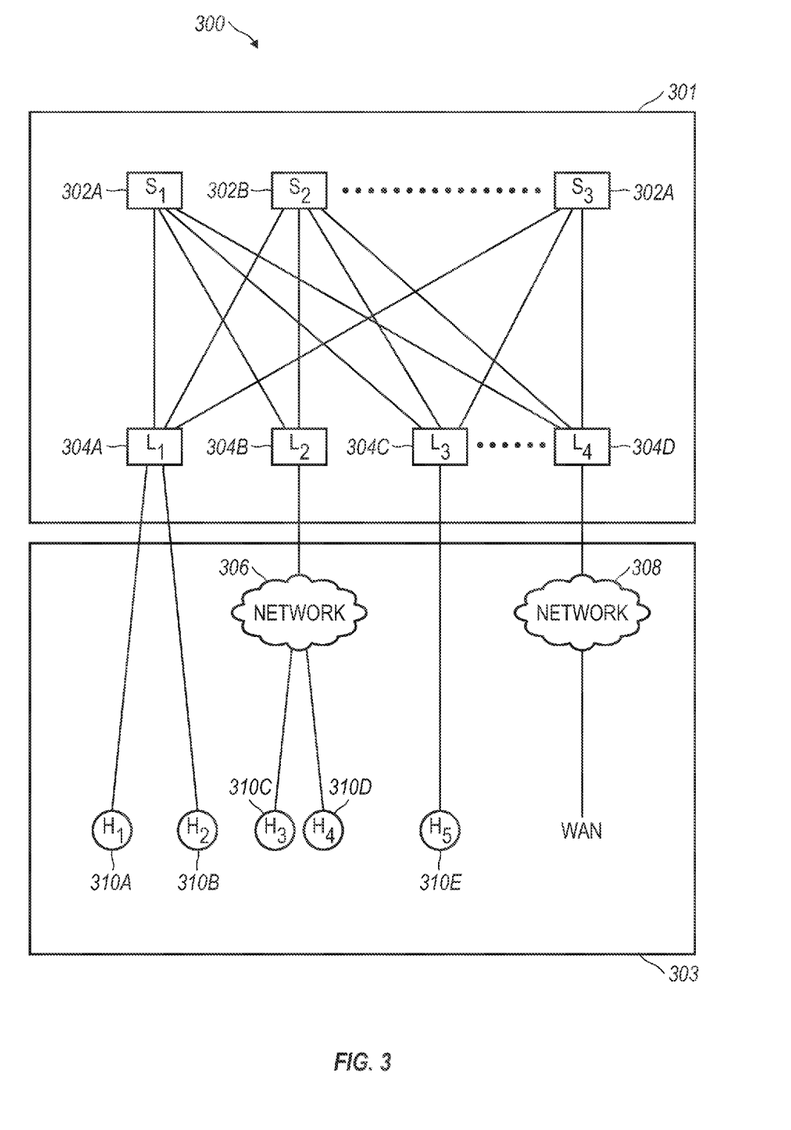
FIG. 3 illustrates an example network topology.

FIG. 3 illustrates an example network topology 300. Topology 300 includes an infra network 301 and a tenant network 303. Infra network 301 can include intermediate network devices, such as, for example, spine switches 302A, 302B, ..., 302C (collectively "302"). In one example, such as a CLOS network, spine switches 302 can be Layer 3 switches connected to leaf switches 304A, 304B, 304C, ..., 304D (collectively "304") in infra network 301. The leaf switches 304 may reside at the edge of the infra network 301 (i.e., the edge of the fabric) and can be responsible for routing or bridging the tenant packets and applying network policies. Tenant network 303 can include one or more endpoints or tenant hosts 310A-E (collectively "310") can connect to the network topology 300 via leaf switches 304. For example, tenant hosts 310A and 310B can connect directly to leaf switch 304A. Similarly, tenant host 310E can connect directly to leaf switch 304C.

Network connectivity in the network topology 300 can flow through the leaf switches 304. In fact, in general, the spine switches 302 will only connect to leaf switches 304. Accordingly, any connections to external networks or servers, such as networks 306 and 308, will flow through the leaf switches 304.

In some cases, a leaf switch may only perform routing functions. However, in other cases, a leaf switch can perform one or more additional functions, such as encapsulating packets, enforcing ingress or egress policies, forwarding traceroute packets to spine switches 302, receiving responsive packets from spine switches and other leaf switches, and determining the end-to-end paths taken by traceroute packets injected into infra network 301.

On the other hand, tenant hosts 310C and 310D can connect to leaf switch 304B via network 306. Similarly, the wide area network (WAN) can connect to the leaf switches 304C or 304D via network 308. Networks 306 and 308 can be public and/or private networks. In some cases, network 306 can be a Layer 2 network, and network 308 can be a Layer 3 network, for example.

In one example, it is desirable to determine the interconnectivity between, for example, tenant host 310A and tenant host 310C. Data packets sent from host 310A in tenant network 303 can take various paths to tenant host 310C. For example, one path could be from leaf node 304A to spine switch 302A to leaf node 304B and to tenant host 310C via network 306. Another path could be via spine switch 302B and leaf node 304B to tenant host 310C. In dense networks, due to the large number of leaf nodes 304 and spine switches 302, it is often quite difficult to determine the exact path taken by a data packet. Thus, if a failure occurs during the routing of the packet, it may be difficult to determine just where the failure occurred. Further, because data network traffic may involve encapsulation protocols such as VXLAN, it is important to explore the connections at the VXLAN infrastructure layer.

According to an example of the present disclosure, a traceroute packet can be generated at ingress leaf node 304A on behalf of a host, such as tenant host 310A, an injected into the hardware forwarding plane of the ingress leaf node to which tenant host 310A is connected, in this example, leaf node 304A, in order to determine a path from the source host 310A to a destination host, i.e., host 310C. In one example, network 300 includes encapsulation technology such as VXLAN, Transport Interconnect of Lots of Links ("TRILL"), Fabric-path or other encapsulation protocols. Although the present disclosure can be used in any encapsulation technology, the ensuing discussion shall focus on VXLAN encapsulation.

VXLAN provides a traffic encapsulation scheme which allows network traffic to be carried across layer 2 (L2) and layer 3 (L3) networks over a logical tunnel. Such VXLAN tunnels can be originated and terminated through VXLAN tunnel end points (VTEPs). Moreover, VXLANs can include VXLAN segments, which can include VXLAN L2 and/or L3 overlay networks over which VMs communicate. The VXLAN segments can be identified through a VXLAN network identifier (VNI), which can specifically identify an associated VXLAN segment.

Leaf node 304A receives the traceroute packet and encapsulates the packet within a VXLAN packet with a source UDP port set to value based on the traceroute packet's header information. For example, if the inner traceroute packet has a source port identified as switch 302A, the VXLAN header will include a source UDP port set such that leaf node 304A will forward the encapsulated packet to spine switch 302A. Leaf node 304A can randomly choose and dynamically vary the source UDP port of the VXLAN packet in order to route the traceroute packet to different spine switches 302 within infra network 301. In this fashion alternate Equal Cost Multi-Path ("ECMP") routes within infra network 301 can be explored.

Figure 4:
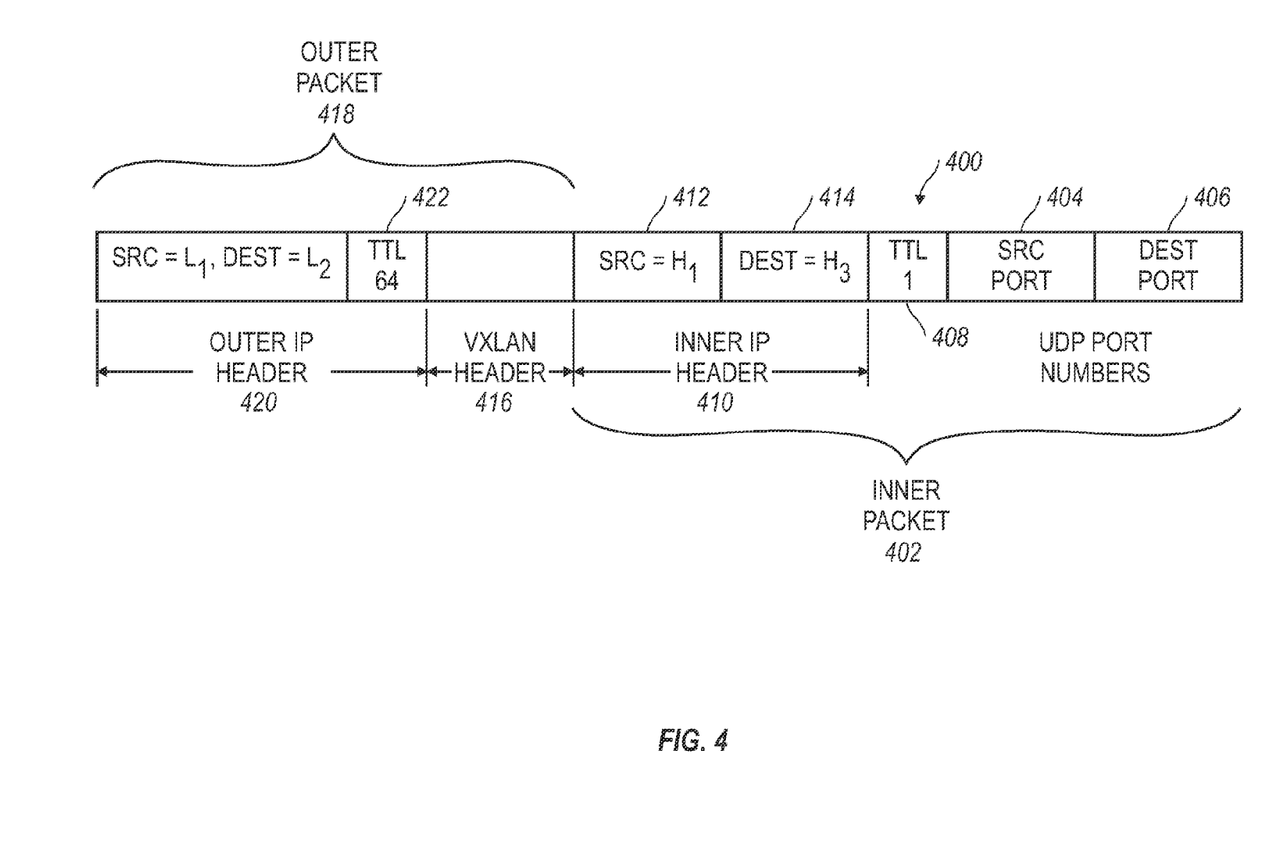
FIG. 4 illustrates an example traceroute packet according to various embodiments of the present disclosure.

FIG. 4 illustrates an example encapsulated traceroute packet 400 used by an embodiment of the present disclosure. Encapsulated traceroute packet 400 includes an inner packet 402 that includes UDP port numbers including source port number 404, destination port number 406, and an inner packet TTL value 408, set to 1. Inner packet 402 also includes an inner IP header 410, which includes a source IP address 412 and destination IP address 414 set to the addresses for which the trace route is being performed. In this example, the source IP address is set to tenant host $H_1$ 310A, and the destination IP address 414 is set to tenant host $H_3$ 310C. As discussed above, leaf node 304A encapsulates inner packet 402 within an outer packet 418, which includes a VXLAN header 416.

Outer packet 418 also includes an outer IP header 420, which includes a source IP address identified as leaf node $L_1$ 304A and a destination IP address identified as leaf node $L_2$ 304B. Thus, the traceroute is to be from tenant host $H_1$ to tenant host $H_2$ via leaf node $L_1$ and leaf node $L_2$. The spine switches 302 that will be utilized depend upon the values of source port 404 and destination port 406. Outer IP header 420 also includes an outer packet TTL value 422, which can be set to an arbitrarily high value, such as, for example, 64. The present disclosure is not limited by any specific value for the outer packet TTL value 422. The outer TTL value limits the maximum number of intermediate nodes by which the outer packet can reach the outer destination.

Figure 5:
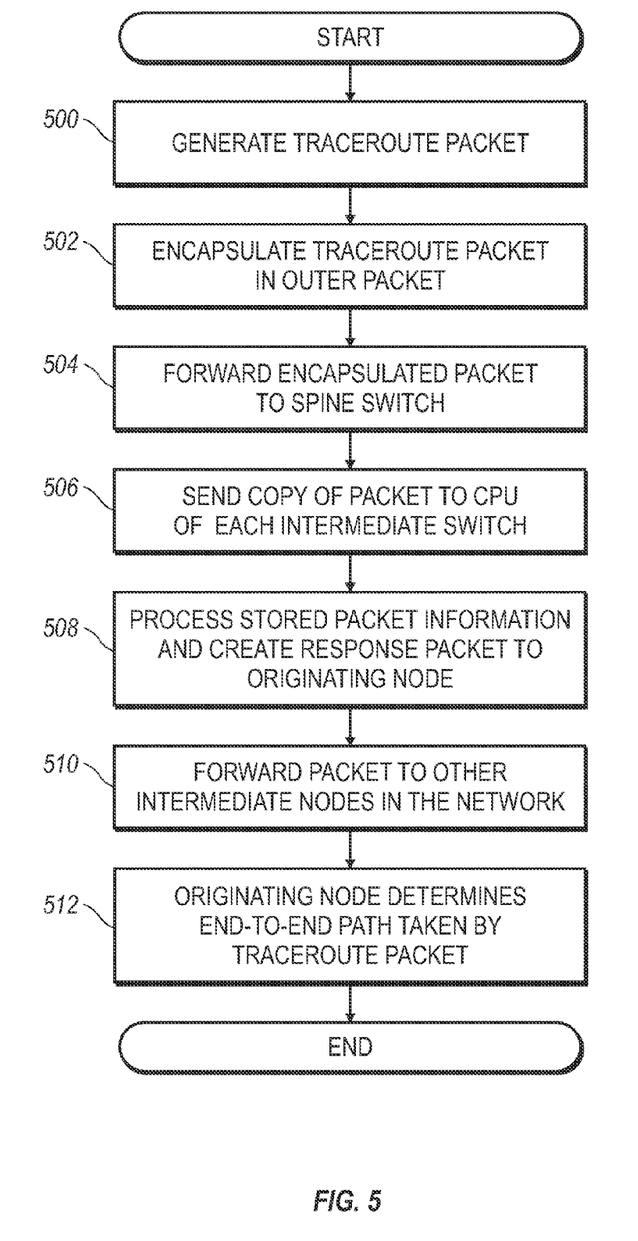
FIG. 5 illustrates an example method utilizing embodiments of the present disclosure.

FIG. 5 illustrates the steps taken by an example of the present disclosure. It should be understood that, for any process discussed herein, there can be additional, fewer, or alternative steps, performed in similar or different orders, or in parallel, within the scope of the various embodiments unless otherwise stated. At step 500, an ingress node, i.e., leaf node 304A, generates a packet containing tenant traffic from a host in the tenant network 303. This packet is a UDP packet having a predefined UDP source port 404 and destination port 406. The source and destination IP addresses of the packet are set to the addresses for which the traceroute is being performed. The inner packet includes a TTL that is set to 1. In the example shown above, a route between host $H_1$ 310A and host $H_3$ 310C is to be probed. Thus, host $H_1$ 310A injects the traceroute packet into the ingress node to which it is connected, leaf node 304A.

At step 502, leaf node 304A encapsulates the packet within an outer packet that includes UDP port numbers set to a value based on the source port information in the traceroute packet. In one example, the network 300 is a VXLAN and the outer packet includes a VXLAN header 416. At step 504, the encapsulated traceroute packet is forwarded by leaf node 304A to the next switch in the infra network 301. In this example, this could be spine switch $S_1$ 302A or spine switch $S_2$ 302B. The spine switch 302 that is chosen is dependent upon the identity of the source port 404 and destination port 406 of inner packet 402.

At step 506, a copy of the encapsulated packet is sent to the CPU of each intermediate switch 302 that the traceroute packet has been forwarded to. This can be done in several ways such as by the use of an access control list ("ACL") based CPU logging feature based on the inner packet's UDP port and TTL value. In another example, a special signature string can be encoded in the payload of the inner packet and this can then be used as a lookup key in the intermediate switches to perform CPU logging. The payload of the inner packet contains information about the originating node (e.g., leaf node $L_1$), the packet ID, and the time signature of the inner packet payload. All of this information is copied to the CPU of each spine switch 302.

At step 508, spine switch 302A (if this was where leaf node 304A forwarded the traceroute packet) processes the stored packet creates a response packet to the originating node, leaf node 304A. This response packet includes information such as the IP address or identifier of the intermediate switch (switch $S_1$), the value of the outer TTL of the CPU packet copy, the ingress and egress port on which the packet was captured, outer and inner packet header information such as the packet's source and destination addresses, and time stamp information. For example, spine switch $S_1$ 302A can respond back to leaf node $L_1$ 304A with information that is received a traceroute packet at a certain time and that the outer TTL of the packet was, for example, 63. Similarly, leaf node $L_1$ 304A may have forwarded a traceroute packet to spine switch $S_2$ 302B. Switch $S_2$ 302B copies the packet to its CPU and forwards a response to leaf node $L_1$ 304A with the information described above.

At step 510, switch $S_1$ 302 forwards the traceroute packet to other intermediate nodes in the network 300, for example, leaf node $L_2$ 304B. Leaf node $L_2$ 304B also copies the packet information to its CPU and generates a response message that is forwarded back to the node that originated the packet, leaf node $L_1$ 304A, that includes information described above. In this example, leaf node $L_2$ 304B will inform leaf node $L_1$ 304A that the outer TTL of the packet $L_2$ 304B received had a TTL value of 62. Leaf node $L_1$ 304A interprets this to mean that the traceroute packet arrived at a spine switch 302, either switch $S_1$ or $S_2$ first, before it was forwarded to leaf node $L_2$ 304B because the value of the outer packet TTL value detected at the spine switch 302 was lower than the value of the outer packet TTL value detected at the leaf node 304. In this fashion, the originating node, leaf node $L_1$ 304A can, at step 512, determine the end-to-end order in which the traceroute packet traversed through infra network 301. In this example, leaf node $L_1$ 304A determines that there are two paths from host H1 to host H2; one path being $L_1$-$S_1$-$L_2$ and the other path being $L_1$-$S_2$-$L_2$. This analysis can be expanded to dense networks that include hundreds of paths with multiple hops.

The packet paths are stitched together based on the response packet's identifier field and TTL value. By sorting or ordering the responding switch's identification (e.g., the switch's IP address) based on the TTL value reported for a given packet identifier, a path is constructed. To explore multiple paths, the originating leaf switch $L_1$ 304A can generate multiple different traceroute packets with varying inner packet UDP source ports. Since each such packet has the likelihood of taking different paths within the infra network, the originating switch can successfully explore all paths.

Leaf $L_1$ 304A is also able to identify the last node (exit node) that the traceroute packet encountered in infra network 301. This occurs when the last node identifies the inner packet TTL value as 1, and sends a message, i.e., an Internet Control Message Protocol ("ICMP") unreachable message, to the originating node. When leaf node $L_1$ 304A receives this message from the last node in the traceroute packet path, i.e., leaf node $L_2$ 304B, leaf node $L_1$ 304A knows that there are no further nodes in the path and can thus identify the entire end-to-end path taken by the traceroute packet within infra network 301, including the exit node. By varying the UDP source port of the inner packet, all other possible alternate paths within infra network 301 can be identified using this same method. Finally, once all the end-to-end paths within infra network 301 are known, other methods can be used to determine alternate paths beyond the infra network 301. Thus, once both the interconnectivity for a given flow within infra network 301 and the ECMP paths outside of the infra network 301 are known, an accurate view of the packet path for various flows between any two end points inside and outside of infra network 301 can be determined.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

I claim:

1. A method comprising:
   generating, at a first network device in a data network, a traceroute packet, the traceroute packet including source and destination address information, and an inner packet time-to-live (TTL) value;
   encapsulating the traceroute packet in an outer packet, the outer packet including a destination address based on the destination address information of the traceroute packet, the outer packet comprising an outer TTL having an initial value;
   forwarding the encapsulated traceroute packet to a second network device in the data network, the encapsulated traceroute packet having a detected outer TTL of a first value, the second network device forwarding the encapsulated traceroute packet to a next of one or more intermediate network devices in the data network, the forwarded encapsulated traceroute packet having a detected outer TTL of a second value, wherein the first value is smaller than the initial value and the second value is smaller than the first value;
   receiving response information from the second network device and each of the intermediate network devices, the response information including a corresponding outer TTL value detected at each of the intermediate network devices;
   determining an end-to-end path taken by the traceroute packet through the data network by utilizing the detected outer TTL of the first value to determine that a response including the detected outer TTL of a first value was received from the second network device and that a response including the detected outer TTL of a second value was received from the next intermediate network device; and
   identifying an exit node on the end-to-end path taken by the traceroute packet based on response information received from the exit node, wherein the response information received from the exit node is based on a detected inner packet TTL value at the exit node.

2. The method of claim 1, wherein the data network is a virtual extensible local area network (VXLAN) and the outer packet includes a VXLAN header.

3. The method of claim 1, wherein the detected inner packet time-to-live (TTL) value is 1.

4. The method of claim 1, further comprising varying User Datagram Protocol (UDP) source port information of the traceroute packet in order to obtain alternate end-to-end paths taken by the traceroute packet through the data network.

5. The method of claim 1, wherein the response information includes at least one of packet identification information, port number, switch identification information or timestamp information.

6. A system comprising:
   a processor; and
   a computer-readable storage medium having stored therein instructions which, when executed by the processor, cause the processor to perform operations comprising:
   generating, at a first network device in a data network, a traceroute packet, the traceroute packet including source and destination address information, and an inner packet time-to live (TTL) value;

encapsulating the traceroute packet in an outer packet, the outer packet including a destination address based on the destination address information of the traceroute packet, the outer packet comprising an outer TTL having an initial value;

forwarding the encapsulated traceroute packet to a second network device in the data network, the second network device forwarding the encapsulated traceroute packet to one or more intermediate network devices in the data network;

receiving response information from the second network device and each of the intermediate network devices, the response information including a corresponding outer time-to-live (TTL) value in packet encapsulation data for the outer packet detected by the second network device and each intermediate network device upon receipt of the traceroute packet;

identifying a path taken by the traceroute packet through the data network;

determining an end-to-end path taken by the traceroute packet through the data network by utilizing the received outer TTL values; and identifying an exit node on the end-to-end path taken by the traceroute packet based on response information received from the exit node, wherein the response information received from the exit node is based on a detected inner packet TTL value at the exit node.

7. The system of claim 6, wherein the data network is a VXLAN and the outer packet includes a VXLAN header.

8. The system of claim 6, wherein the detected inner packet TTL value is 1.

9. The system of claim 6, wherein the processor is further configured to vary UDP source port information of the traceroute packet in order to obtain alternate end-to-end paths taken by the traceroute packet through the data network.

10. The system of claim 6, wherein the response information includes at least one of packet identification information, port number, switch identification information or timestamp information.

11. A non-transitory computer-readable storage medium having stored therein instructions which, when executed by a processor, cause the processor to perform operations comprising:

generating, at a first network device in a data network, a traceroute packet, the traceroute packet including source and destination address information, and an inner packet time-to-live (TTL) value;

encapsulating the traceroute packet in an outer packet, the outer packet including an initial time-to-live (TTL) value and a destination address based on the destination address information of the traceroute packet;

forwarding the encapsulated traceroute packet to a second network device in the data network, the second network device receiving and forwarding the encapsulated traceroute packet to one or more intermediate network devices in the data network;

receiving response information from the second network device and each of the intermediate network devices, the response information including a current time-to-live (TTL) value in packet encapsulation data for the outer packet detected by the second network device and each intermediate network device upon receipt of the encapsulated traceroute packet;

identifying a path taken by the traceroute packet through the data network;

determining an end-to-end path taken by the traceroute packet through the data network by utilizing the received current TTL values for the outer packet; and identifying an exit node on the end-to-end path taken by the traceroute packet based on response information received from the exit node, wherein the response information received from the exit node is based on a detected inner packet TTL value at the exit node.

12. The non-transitory computer-readable storage medium of claim of claim 11, wherein the data network is a VXLAN and the outer packet includes a VXLAN header.

13. The non-transitory computer-readable storage medium of claim of claim 11, wherein the detected inner packet TTL value is 1.

14. The non-transitory computer-readable storage medium of claim 11, storing additional instructions which, when executed by the processor, result in operations further comprising varying UDP source port information of the traceroute packet in order to obtain alternate end-to-end paths taken by the traceroute packet through the data network.

* * * * *